(12) United States Patent
Aoki

(10) Patent No.: US 7,611,158 B2
(45) Date of Patent: Nov. 3, 2009

(54) TUBULAR FOOTREST FOR A STRADDLE-TYPE VEHICLE

(75) Inventor: Kazushige Aoki, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 136 days.

(21) Appl. No.: 12/036,935

(22) Filed: Feb. 25, 2008

(65) Prior Publication Data

US 2008/0203765 A1 Aug. 28, 2008

(30) Foreign Application Priority Data

Feb. 26, 2007 (JP) ............................. 2007-046035

(51) Int. Cl.
*B62K 11/04* (2006.01)
(52) U.S. Cl. .................................................... 280/291
(58) Field of Classification Search ................ 280/291; 403/107, 167, 193, 196
See application file for complete search history.

(56) References Cited

U.S. PATENT DOCUMENTS

| 3,794,353 | A | * | 2/1974 | Oliver | 280/291 |
| 4,384,731 | A | * | 5/1983 | Webb | 280/87.01 |
| 6,116,630 | A | * | 9/2000 | Thomas | 280/291 |
| 7,540,348 | B2 | * | 6/2009 | Ishida et al. | 180/228 |
| 2003/0173756 | A1 | * | 9/2003 | Mullins | 280/265 |

FOREIGN PATENT DOCUMENTS

| JP | 01190593 A | * | 7/1989 |
| JP | 09-175465 | | 7/1997 |

\* cited by examiner

*Primary Examiner*—Kevin Hurley
(74) *Attorney, Agent, or Firm*—Hogan & Hartson LLP

(57) ABSTRACT

A straddle-type having a foot rest formed by a bar-shaped member disposed along a vehicle width direction and attached to a lower portion of a power unit. The footrest is formed by a cylindrical tubular member. An attachment portion of the footrest attached to a bottom face of a crank case of an engine has a recessed portion formed by bending a recess in to the tubular member. Minimum ground clearance and sufficient footrest rigidity is thereby provided.

11 Claims, 8 Drawing Sheets

TUBULAR FOOTREST FOR A STRADDLE-TYPE VEHICLE

RELATED APPLICATIONS

This application claims the benefit of priority under 35 USC 119 of Japanese patent application no. 2007-046035, filed on Feb. 26, 2007, which application is hereby incorporated by reference in its entirety.

BACKGROUND OF THE INVENTION

1. Field of the Invention

The invention relates to a straddle-type vehicle that includes a power unit, and more particularly to a footrest that is attached to a bottom face of the power unit and extends along a vehicle width direction.

2. Description of Related Art

A straddle-type vehicle such as an underbone motorcycle often includes a footrest attached to an engine that is disposed below a down tube. Generally, the footrest is a bar-shaped member that is disposed along a vehicle width direction. The footrest is typically fixed to the engine, more specifically, the crank case, from the bottom side of the motorcycle using a fixing plate.

In a motorcycle with such a footrest attachment structure, an under-guard may be attached to cover a lower portion of the engine to the fixing plate of the footrest in an overlapping manner from the bottom side of the motorcycle (see, for example, JP-A-3529526, pages 2-3, FIGS. 2 and 3.) When driving over a bump that may touch the lower part of the engine, the under-guard and fixing plate slide over the protrusion and prevent the footrest from catching on the bump.

However, this footrest attachment structure has a problem in that, since the footrest is attached to the crank case from the bottom side of the motorcycle, minimum ground clearance may not be sufficiently secured.

If a seat position is lowered to improve the ease with which a rider can reach his/her feet to the ground, the mounting position of the engine is also lowered. Therefore, the minimum ground clearance becomes even smaller due to the footrest being attached to the crank case from the bottom side of the motorcycle.

The minimum ground clearance may be increased by reducing the thickness of the bar-shaped member used for the footrest. However, this creates another problem in that the rigidity of the footrest is reduced.

SUMMARY OF THE INVENTION

The invention has been devised in light of these circumstances and ensures minimum necessary ground clearance and footrest rigidity in a straddle-type vehicle having a footrest formed by a bar-shaped member that is disposed along a vehicle width direction and attached to the lower portion of the power unit.

A straddle-type vehicle according to one embodiment of the invention includes a wheel; a power unit that generates driving force for the wheel; and a footrest that is attached to a bottom face of the power unit and extends along a vehicle width direction. The footrest is formed by a tubular member, and an attachment portion that is attached to the bottom face of the power unit has a first relief portion formed by pressing the tubular member in a recess shape.

In the straddle-type vehicle of the invention, the attachment portion attached to the bottom face of the power unit has a first relief portion formed by pressing the tubular member in a recess shape. Accordingly, when the footrest is disposed along the vehicle width direction and is attached to the lower portion of the power unit, minimum necessary ground clearance is easily secured. Furthermore, since the first relief portion is formed by pressing the tubular member in the recess shape, the thickness of the bar-shaped member that is used for the footrest is not reduced. Thus, there is no significant reduction in the rigidity of the footrest.

In one embodiment, the first relief portion has a concave shape that is recessed toward an inner side in relation to an outer peripheral surface of the tubular member.

In one embodiment, the first relief portion is formed only at one section of the outer peripheral surface of the tubular member.

In one embodiment, the tubular member has a cylindrical tubular shape.

In one embodiment, the first relief portion has an arc shape at a section in a longitudinal direction and a vertical direction of the footrest.

In one embodiment, the first relief portion is formed at an area that faces the bottom face of the power unit.

In one embodiment, a fixing member secures the footrest to the bottom face of the power unit. The fixing member has a second relief portion to avoid interference with an accessory member of the straddle-type vehicle. The second relief portion is formed at a location different from the first relief portion.

In one embodiment, the fixing member covers the footrest from a bottom side of the power unit, and the second relief portion is a notch that is formed on the fixing member.

In one embodiment, the power unit is secured to a vehicle body frame, and the accessory member is a brake pedal that extends from the vehicle body frame.

According to the invention, a straddle-type vehicle is provided that ensures minimum necessary ground clearance and rigidity of a footrest formed by a bar-shaped member disposed along the vehicle width direction and attached to a lower portion of a power unit.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Figure 1:
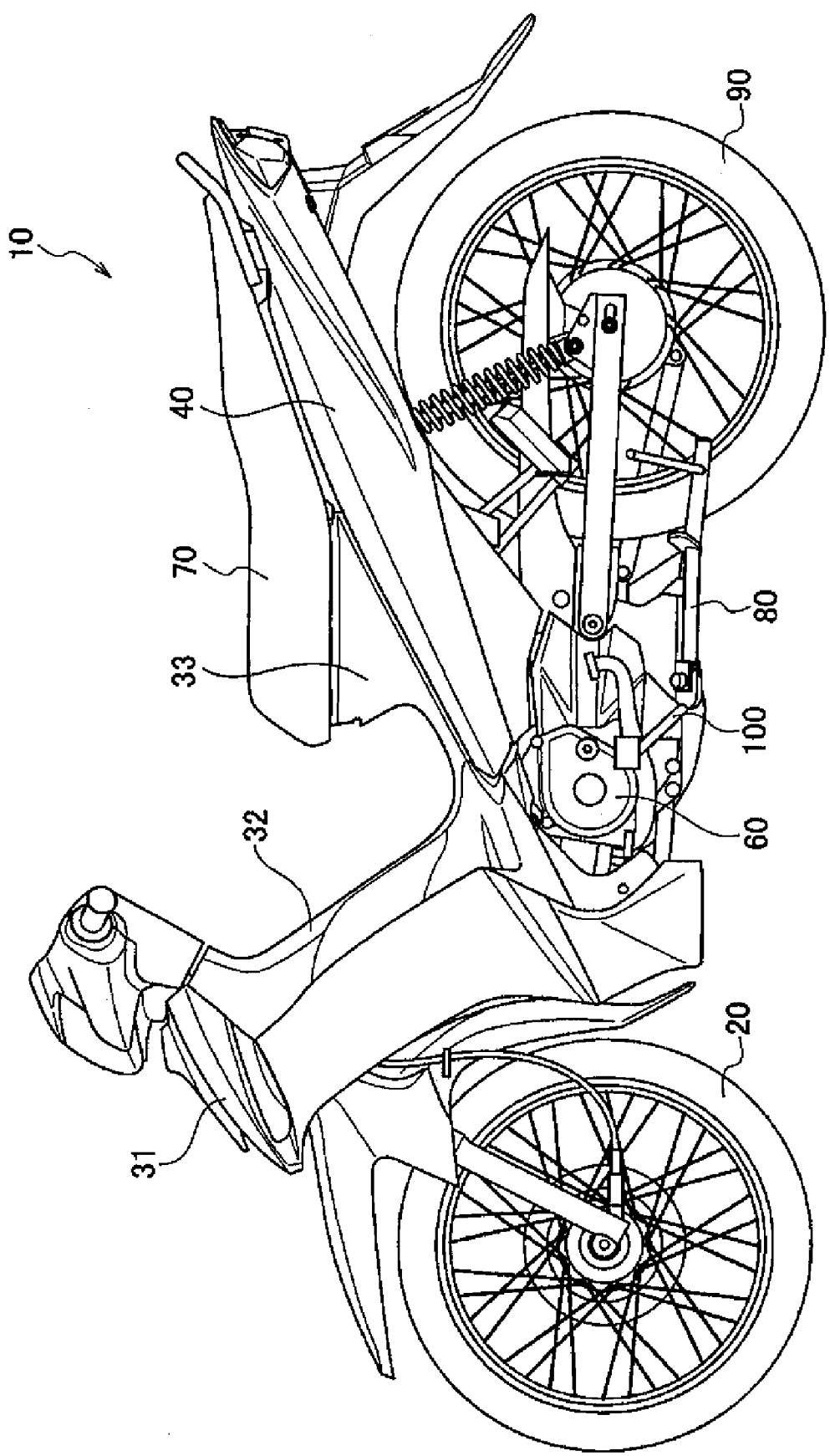
FIG. 1 is a left side view of a motorcycle according to an embodiment of the invention.

An embodiment of a straddle-type vehicle according to the invention is now described with reference to the drawings. In the drawings, structural members that are the same or similar are denoted with same or similar reference numerals. The figures are schematic, and thus the relative scale of dimensions and the like may be different from those of the real object. Specific dimensions and the like can be determined with reference to the following description. In addition, the relationship and scale of respective dimensions vary from figure to figure.

(Structure of the Straddle-Type Vehicle)

Figure 2:
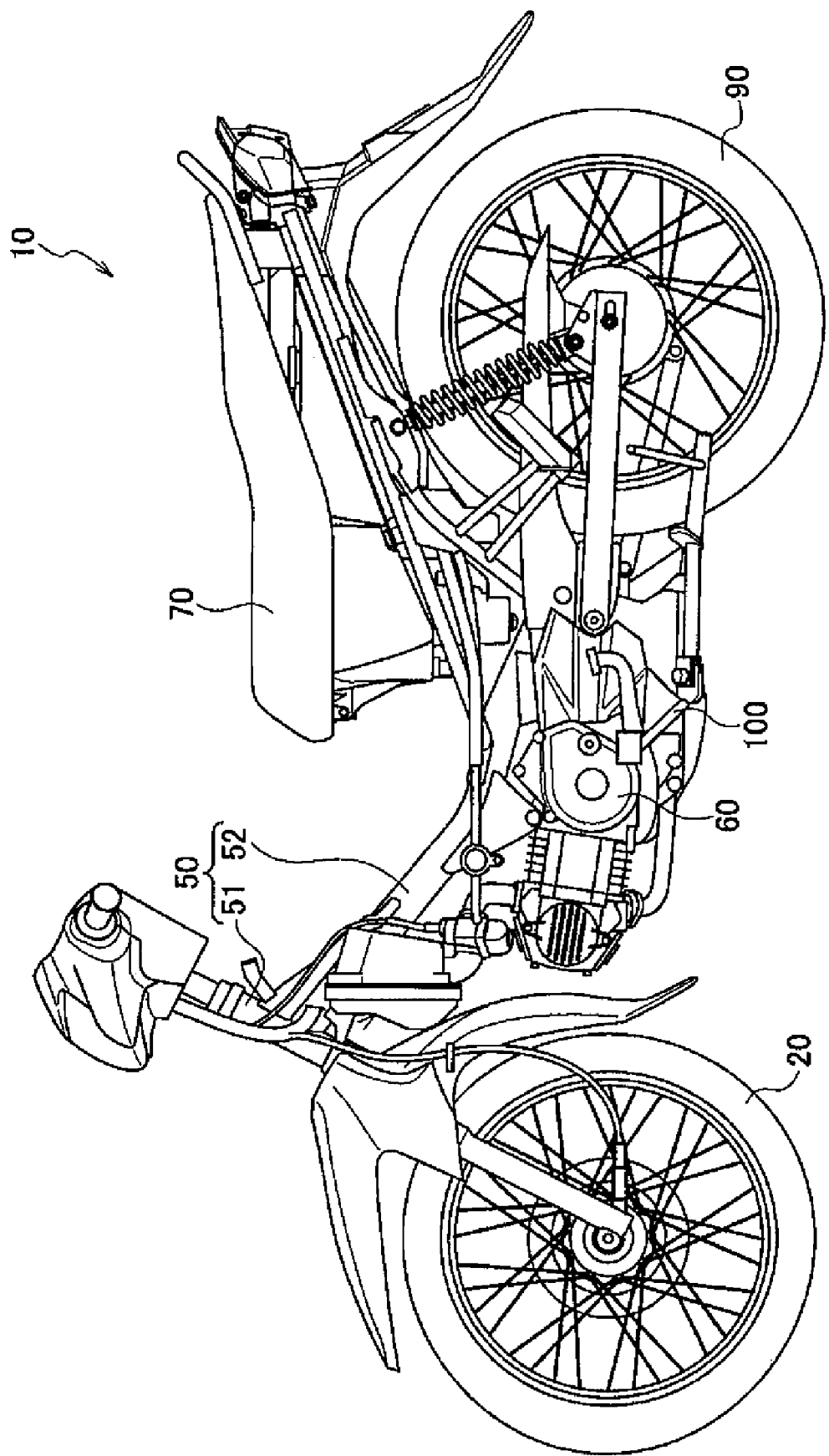
FIG. 2 is a left side view of the motorcycle with a vehicle body cover removed.

FIG. 1 is a left side view of a motorcycle 10 embodying a straddle-type vehicle according to the present invention. FIG. 2 is a left side view of motorcycle 10 with a vehicle body cover removed.

Motorcycle 10 is an underbone motorcycle with a body frame 50 that is disposed further downwards relative to that of a standard straddle-type motorcycle. Motorcycle 10 has a front wheel 20 and a rear wheel 90. An engine 60 (power unit) fixed to body frame 50 generates driving force that drives rear wheel 90.

A body cowl 31 is disposed in front of a steering head pipe 51 and attached to a leg shield 32. Leg shield 32 is fixed to a down tube 52 that extends downward from steering head pipe 51 so as to be disposed in front of the legs of a rider seated on seat 70. An under seat cover 33 disposed under seat 70 is connected with leg shield 32 and a side cover 40. Note that, while a left side of motorcycle 10 is shown in the drawing figures, the right side of motorcycle 10 has symmetrical components, including a side cover with a shape that is generally symmetrical to that of side cover 40.

A footrest 100 on which a rider rests his/her feet is disposed further down from seat 70 and is attached to engine 60, more specifically, to a crank case 62. A side stand 80 that supports and prevents motorcycle 10 from falling over when it is parked is provided on the left side of motorcycle 10.

(Footrest Attachment State)

Figure 3:
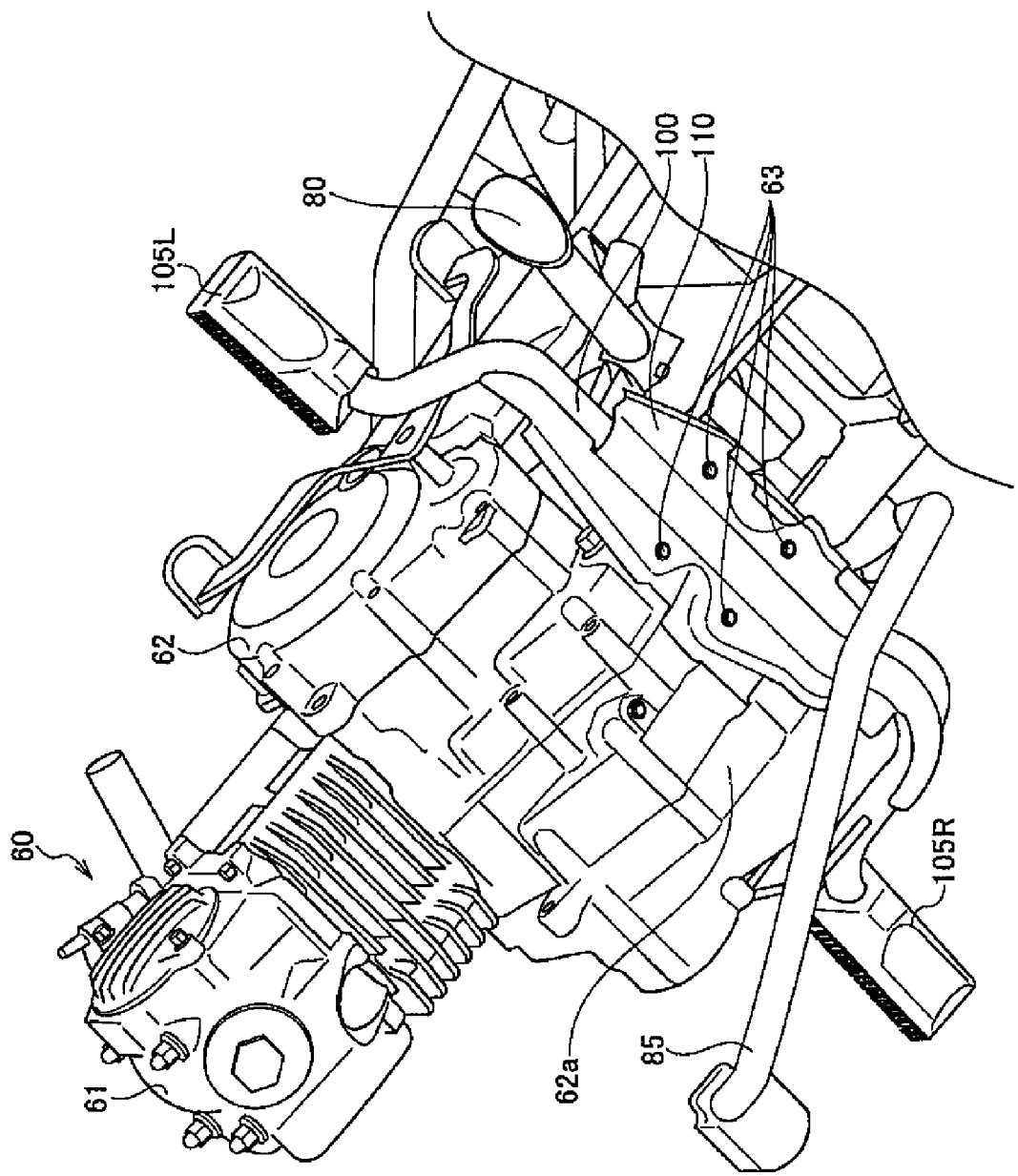
FIG. 3 is a bottom perspective view of a power unit according to an embodiment of the invention.

An attachment state of footrest 100 is now described. FIG. 3 is a perspective view from the bottom of engine 60. As shown in FIG. 3, engine 60 has a cylinder head 61 and a crank case 62.

Footrest 100 is attached to engine 60, more specifically, to a bottom face 62a of crank case 62. Footrest 100 is formed by bending a cylindrical tubular member. Footrest 100 extends along a vehicle width direction. Steps 105L and 105R are provided, respectively, on left and right ends of footrest 100 for the feet of the rider to be rested.

Footrest 100 is fixed to bottom face 62a of crank case 62 by a fixing plate (fixing member) 110. More specifically, footrest 100 is welded to fixing plate 110. Fixing plate 110 covers footrest 100 from the bottom side of engine 60. Bolts 63 are inserted into bolt holes 110a-110d (FIG. 4) formed on fixing plate 110. Bolts 63 are screwed into female thread portions formed on bottom face 62a of crank case 62 to fix footrest 100 to bottom face 62a of crank case 62.

A brake pedal (accessory member) 85 provided under footrest 100 extends toward the right side of motorcycle 10 from vehicle body frame 50. Brake pedal 85 is operated by the right foot of the rider to brake rear wheel 90.

(Shapes of the Footrest and the Fixing Member)

The shapes of footrest 100 and fixing plate 110 are now explained with reference to FIGS. 4-8.

(1) Outer Shape

Figure 4:
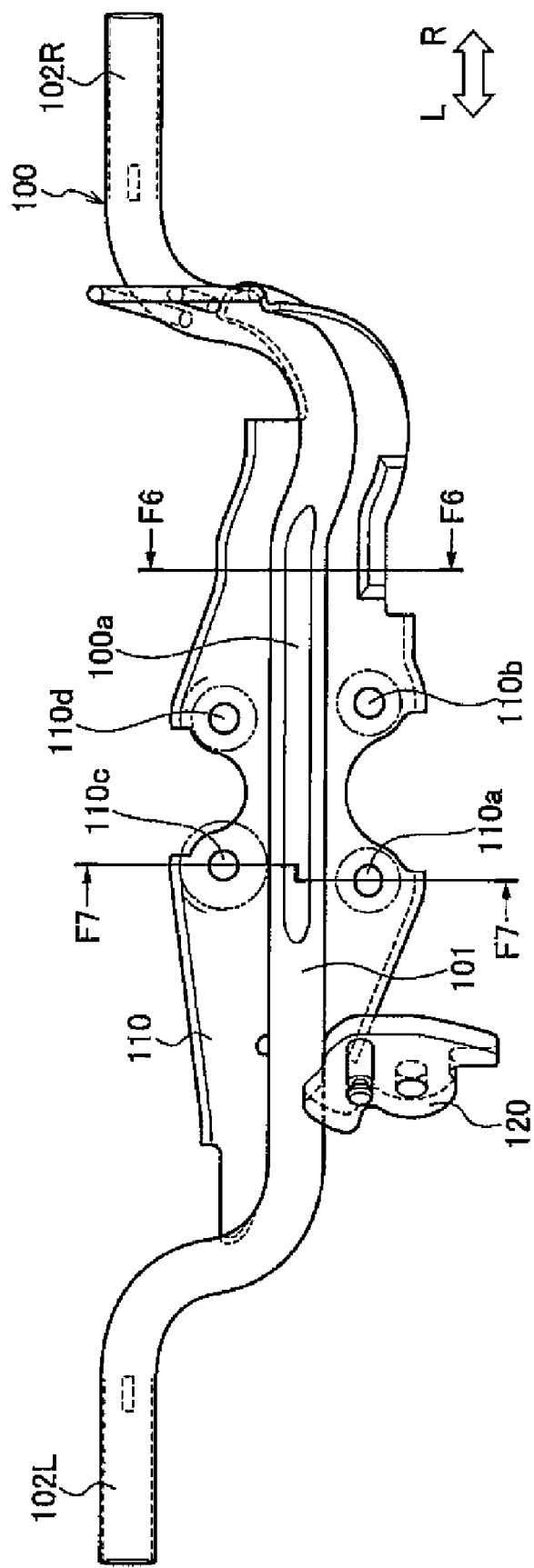
FIG. 4 is a plan view of a footrest and a fixing member according to an embodiment of the invention.
Figure 5:
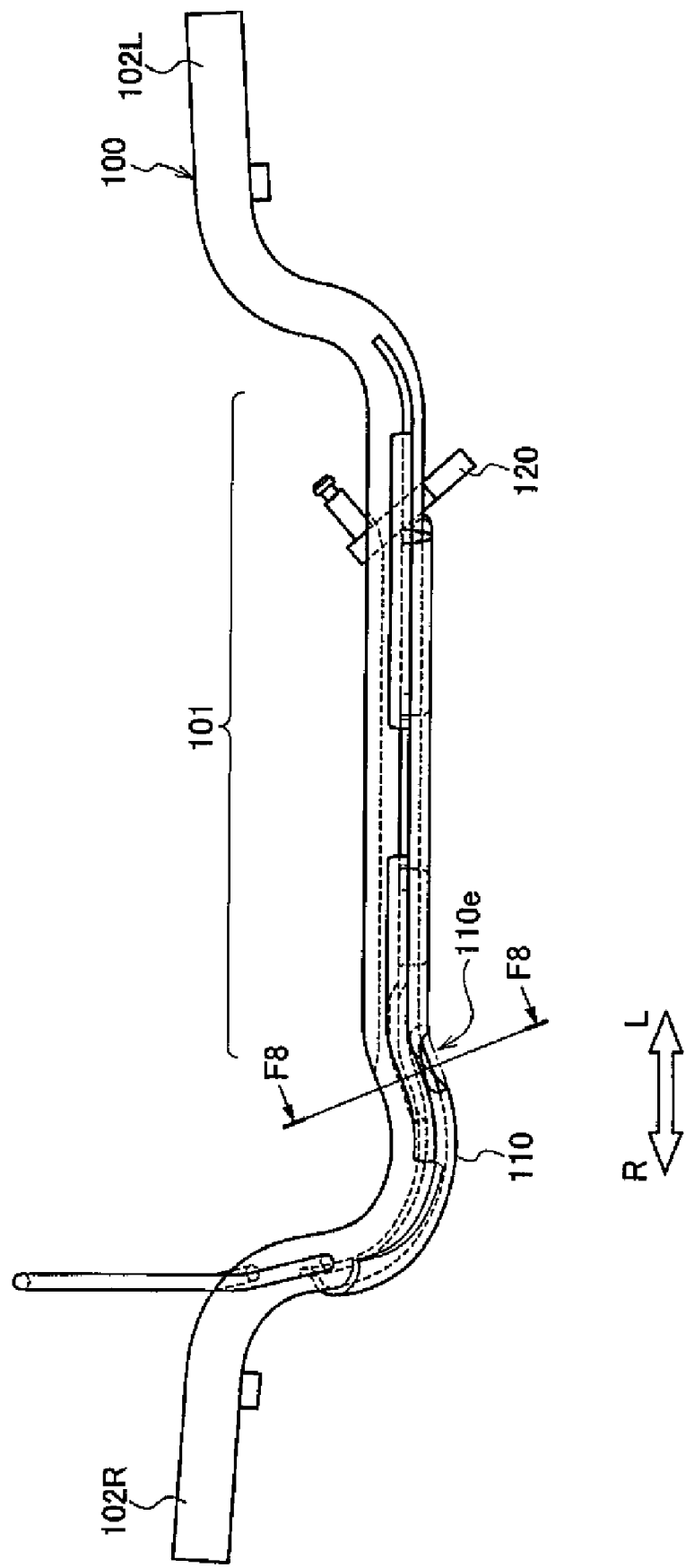
FIG. 5 is a front view of the footrest and the fixing member.

FIG. 4 is a plan view of footrest 100 and fixing plate 110. FIG. 5 is a front view of footrest 100 and fixing plate 110.

An attachment portion 101 of footrest 100 is attached to bottom face 62a of crank case 62 (FIG. 3) using fixing plate 110. Step attachment portions 102L and 102R of footrest 100 continue and extend from attachment portion 101 toward the outside in the vehicle width direction. Each of step attachment portions 102L and 102R has a portion that is bent in an upward direction toward seat 70. That is, step attachment portions 102L and 102R are positioned above attachment portion 101 and closer to seat 70.

A recessed portion 100a is formed in a section of attachment portion 101 by pressing a recess shape into the tubular member that forms footrest 100. In the present embodiment, recessed portion 100a forms a first relief portion.

Footrest 100 is, as described above, welded to fixing plate 110. Fixing plate 110 surrounds attachment portion 101 of footrest 100 and is provided with bolt holes 110a-110d into which bolts 63 are inserted.

Fixing plate 110 is provided with a notch 110e for avoiding interference with brake pedal 85. In the present embodiment, notch 110e forms a second relief portion. Notch 110e is located at a different position from recessed portion 100a.

(2) The Shape of Recessed Portion 100a (the First Relief Portion)

Figure 6:
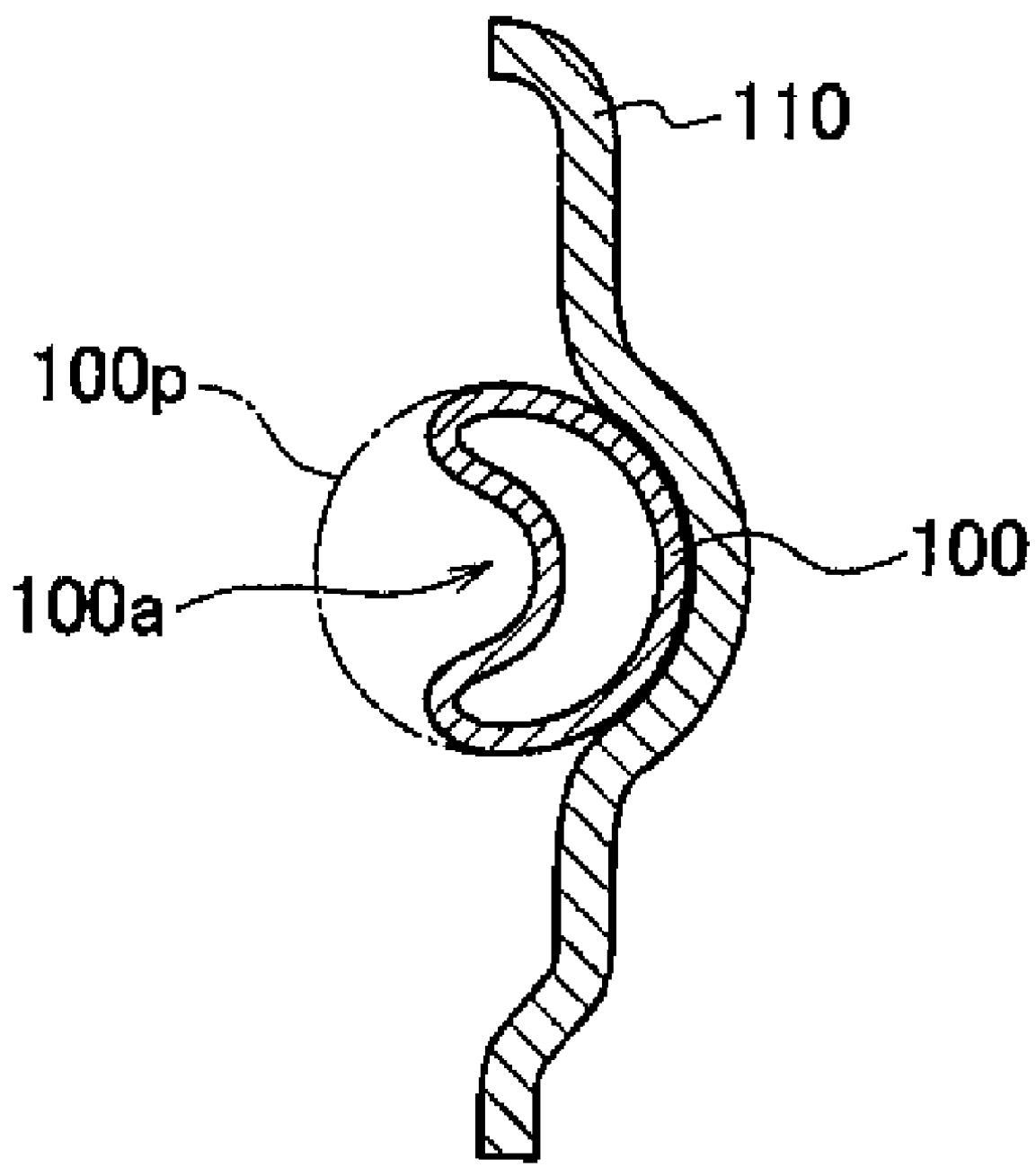
FIG. 6 is a sectional view of the footrest and fixing member taken along line F6-F6 of FIG. 4.
Figure 7:
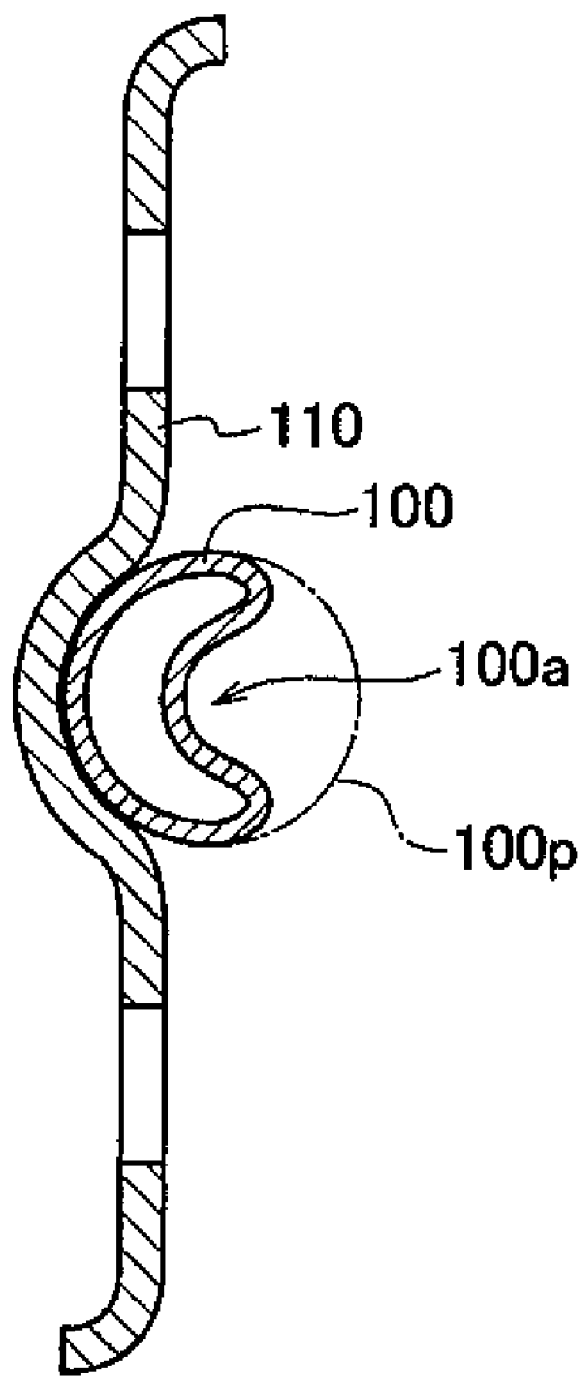
FIG. 7 is a sectional view of the footrest and fixing member taken along line F7-F7 of FIG. 4.

FIG. 6 is a sectional view of footrest 100 and fixing plate 110 taken along line F6-F6 of FIG. 4. FIG. 7 is a sectional view of footrest 100 and fixing plate 110 taken along line F7-F7 of FIG. 4.

As shown in FIGS. 6 and 7, in the longitudinal and vertical sections of footrest 100, footrest 100 is bent toward the inner side in relation to an outer peripheral surface 100p of the tubular member that forms footrest 100. Recessed portion 100a is formed by bending footrest 100 toward the inner side in relation to outer peripheral surface 100p. In the present embodiment, recessed portion 100a has a concave shape that is recessed toward the inner side in relation to outer peripheral surface 100p of footrest 100. Furthermore, in the longitudinal and vertical sections of footrest 100, recessed portion 100a has an arc shape.

Recessed portion 100a is formed only in one portion of outer peripheral surface 100p. More specifically, recessed portion 100a is formed at an area that faces bottom face 62a of crank case 62. That is, the longitudinal and vertical sections of footrest 100 at the portion where recessed portion 100a is formed, takes on an arc shape in which a lower portion forms an arch shape.

(2) The Shape of Notch 110e (the Second Relief Portion)

Figure 8:
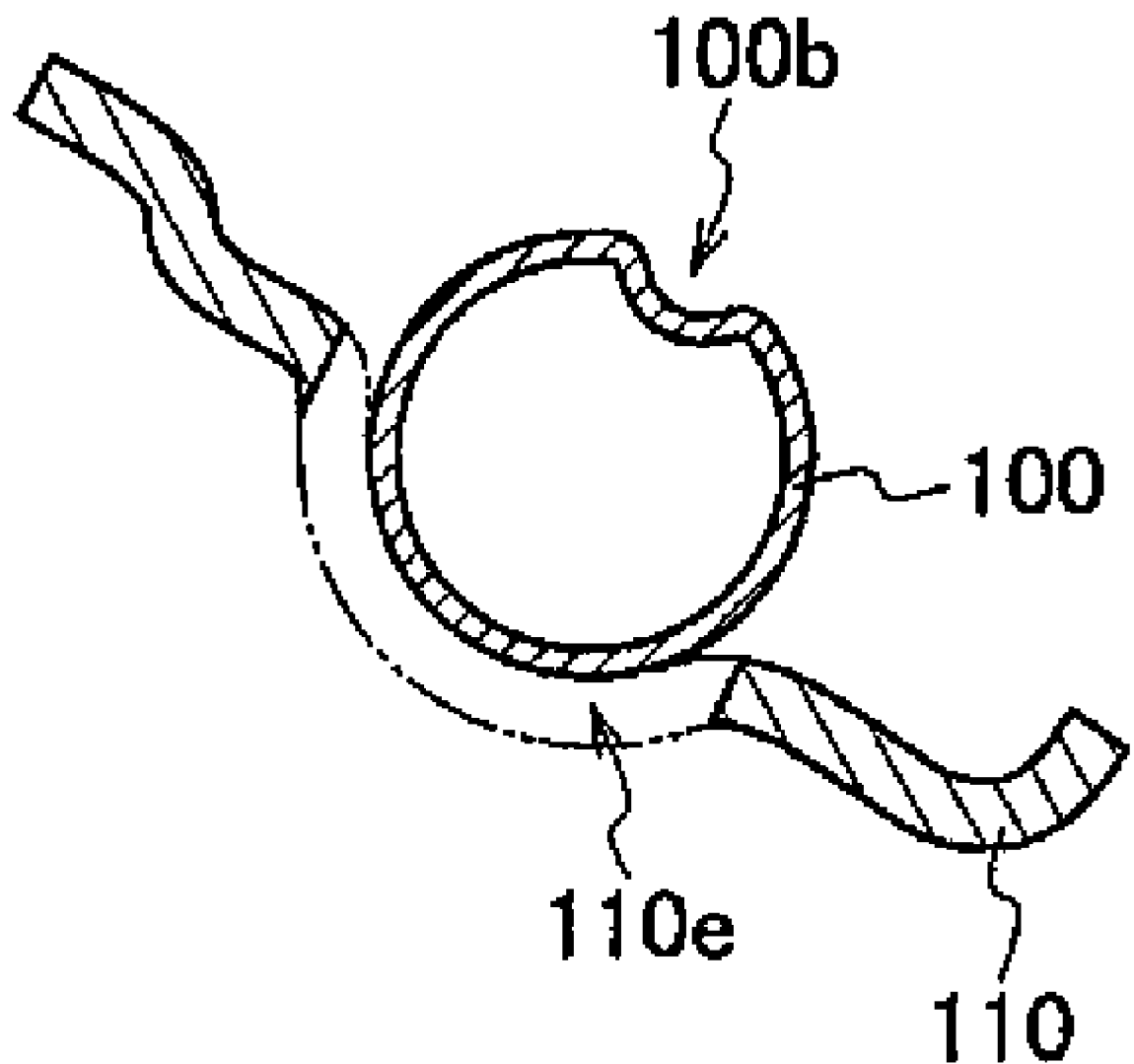
FIG. 8 is a sectional view of the footrest and fixing member taken along line F8-F8 of FIG. 5.

The shape of notch 110e formed on fixing plate 110 is described with reference to FIGS. 5-8. FIG. 8 is a sectional view of footrest 100 and fixing plate 110 taken along line F8-F8 of FIG. 5.

Notch 110e is provided to avoid interference with brake pedal 85. As shown in FIGS. 5 and 8, notch 110e has a concave shape that is recessed toward bottom face 62a of crank case 62 in a front view of footrest 100.

Furthermore, as shown in FIG. 8, footrest 100 is formed with a recessed portion 100b at an area where notch 110e is formed. Recessed portion 100b is formed on the side of bottom face 62a of crank case 62, and is recessed toward the inner side in relation to outer peripheral surface 100p (refer to FIGS. 6 and 7) of footrest 100. The level of the recess of recessed portion 100b is smaller than that of recessed portion 100a.

(Operation and Advantages)

In motorcycle 10, recessed portion 100a is formed in a portion of attachment portion 101 of footrest 100 that is attached to bottom face 62a of crank case 62 by bending the tubular member that forms footrest 100 in a recess shape. Therefore, when footrest 100 is disposed along the vehicle width direction and attached to the lower portion of engine 60, minimum necessary ground clearance is easily secured. Furthermore, since recessed portion 100a is formed by pressing the tubular member in a recess shape, there is no need to reduce the thickness of the tubular member used for footrest 100. Reduced rigidity of footrest 100 is thereby inhibited.

In the present embodiment, recessed portion 100a has a concave shape that is recessed toward the inner side in relation to outer peripheral surface 100p of the tubular member. Furthermore, recessed portion 100a has an arc shape at the longitudinal and vertical sections of footrest 100. Therefore, as compared with a tubular member that is simply pressed in the recess shape, reduced rigidity of footrest 100 is inhibited.

In the present embodiment, recessed portion 100a is formed only at one section of outer peripheral surface 100p. More specifically, recessed portion 100a is formed in an area that faces bottom face 62a of crank case 62. Thus, the longitudinal and vertical sections of footrest 100 at a portion where recessed portion 100a is formed take on an arc shape. Accordingly, weight applied on footrest 100 when a rider's feet are rested on steps 105L and 105R is reliably endured.

In the present embodiment, fixing plate 110 is provided with notch 110e to avoid interference with brake pedal 85. Notch 110e is formed at a position different from recessed portion 100a. Therefore, even if an accessory member of motorcycle 10 is disposed under footrest 100, the rigidity of footrest 100 and minimum ground clearance are secured.

Other Embodiments

One embodiment has been described to disclose the features of the invention. However, the invention is not limited to the specific embodiment of the description and drawings. Various modified forms of the invention will be apparent from the disclosure to those of skill in the art.

For example, fixing plate 110 has been described as being provided with notch 110e to avoid interference with brake pedal 85. However, notch 110e may not be provided, and the accessory member disposed under footrest 100 may not be a brake pedal.

In the aforementioned embodiment, recessed portion 100a has been described as being formed in a concave shape that is recessed toward the inner side in relation to outer peripheral surface 100p of the tubular member. However, recessed portion 100a may not be formed in a concave shape. For example, the longitudinal and vertical sections of footrest 100 may be formed to have an oval shape that has a long width that extends in the longitudinal direction of motorcycle 10. Furthermore, while footrest 100 has been described as formed by bending a cylindrical tubular member, footrest 100 may be formed in other ways, for instance, as a square tubular member.

In the above-described embodiment, footrest 100 is described as being formed integrally with the left side portion (step 105L) and the right side portion (step 105R). However, the left and right side portions of the footrest may be formed as separate pieces.

In the aforementioned embodiment, engine 60 is described as being mounted on motorcycle 10. However, an electric motor may be mounted as a power unit in place of engine 60.

Thus, as is readily apparent, the invention includes various modified embodiments not specifically described herein, and the scope of the invention is set forth in the following claims.

The invention claimed is:

1. A straddle-type vehicle comprising:
    a wheel;
    a power unit that generates driving force for the wheel; and
    a footrest that is attached to a bottom face of the power unit and extends along a vehicle width direction, wherein
    the footrest is formed by a tubular member, and an attachment portion that is attached to the bottom face of the power unit is formed with a first relief portion by bending a recess into the tubular member.

2. The straddle-type vehicle according to claim 1, wherein the first relief portion has a concave shape that is recessed toward an inner side in relation to an outer peripheral surface of the tubular member.

3. The straddle-type vehicle according to claim 2, wherein the first relief portion is formed only in one portion of the outer peripheral surface of the tubular member.

4. The straddle-type vehicle according to claim 1, wherein the tubular member has a cylindrical tubular shape.

5. The straddle-type vehicle according to claim 4, wherein the first relief portion has an arc shape in a section in longitudinal and vertical directions of the footrest.

6. The straddle-type vehicle according to claim 4, wherein the first relief portion is formed at an area that faces the bottom face of the power unit.

7. The straddle-type vehicle according to claim 1, comprising:
    a fixing member that secures the footrest to the bottom face of the power unit, wherein
    the fixing member is provided with a second relief portion to avoid interference with an accessory member of the straddle-type vehicle, and
    the second relief portion is formed at a location different from the first relief portion.

8. The straddle-type vehicle according to claim 7, wherein the fixing member covers the footrest from a bottom side of the power unit, and
    the second relief portion is a notch that is formed on the fixing member.

9. The straddle-type vehicle according to claim 7, comprising:
    a body frame to which the power unit is secured, and
    the accessory member is a brake pedal that extends from the body frame and is used for braking the wheel.

10. The straddle-type vehicle according to claim 1, wherein the power unit is an engine.

11. The straddle-type vehicle according to claim 1, wherein the straddle-type vehicle is an underbone motorcycle.

\* \* \* \* \*